United States Patent
Duan

(10) Patent No.: US 12,225,083 B2
(45) Date of Patent: Feb. 11, 2025

(54) AGGREGATING DATA IN A COMPUTER CLUSTER WITH MULTIPLE GROUPS

(71) Applicant: HUAWEI TECHNOLOGIES CO., LTD., Guangdong (CN)

(72) Inventor: Qihang Duan, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 45 days.

(21) Appl. No.: 18/117,242

(22) Filed: Mar. 3, 2023

(65) Prior Publication Data
US 2023/0208915 A1      Jun. 29, 2023

Related U.S. Application Data

(63) Continuation of application No. PCT/CN2021/106804, filed on Jul. 16, 2021.

(30) Foreign Application Priority Data

Sep. 4, 2020   (CN) .......................... 202010920720.5

(51) Int. Cl.
*H04L 41/12*   (2022.01)
*H04L 47/70*   (2022.01)
*H04L 67/1097* (2022.01)
*G06F 15/173*  (2006.01)
*H04L 1/00*    (2006.01)
*H04L 45/24*   (2022.01)
*H04L 47/41*   (2022.01)
*H04L 49/15*   (2022.01)

(52) U.S. Cl.
CPC .......... *H04L 67/1097* (2013.01); *H04L 41/12* (2013.01); *H04L 47/829* (2013.01)

(58) Field of Classification Search
None
See application file for complete search history.

(56) References Cited

U.S. PATENT DOCUMENTS

| 10,284,383 B2* | 5/2019 | Bloch | H04L 12/44 |
| 2017/0366411 A1* | 12/2017 | Jiang | H04L 12/2809 |
| 2018/0183857 A1* | 6/2018 | Langer | H04L 67/01 |

OTHER PUBLICATIONS

Faraj et al., "Bandwidth Efficient All-to-All Broadcast on Switched Clusters," Proceedings of 2005 IEEE International Conference on Cluster Computing, Sep. 2, 2005, pp. 1-10.
Rabenseifner, "Chapter 5: Basic Collective Communication," Introduction to parallel programming, Oct. 23, 2020, 30 pages.
Anonymous [online], "Generalized forms of gather—Intermediate MPI," Jun. 14, 2022, retrieved on Jan. 8, 2024, retrieved from URL <https://enccs.github.io/intermediate-mpi/collective-communication-pt3/>, 6 pages.
Extended European Search Report in European Appln No. 21863396.4, dated Jan. 22, 2024, 11 pages.

* cited by examiner

*Primary Examiner* — Kamal M Hossain
(74) *Attorney, Agent, or Firm* — Fish & Richardson P.C.

(57) ABSTRACT

This application provides a data processing method. One example method includes: A switching node, that is, a first top node, that is in a first group and that is configured to communicate with a second top node in a second group receives first data sent by a child node; then the first top node receives second data sent by the second top node; and then the first top node aggregates the first data and the second data, to obtain third data.

20 Claims, 9 Drawing Sheets

AGGREGATING DATA IN A COMPUTER CLUSTER WITH MULTIPLE GROUPS

CROSS-REFERENCE TO RELATED APPLICATIONS

This application is a continuation of International Application No. PCT/CN2021/106804, filed on Jul. 16, 2021, which claims priority to Chinese Patent Application No. 202010920720.5, filed on Sep. 4, 2020. The disclosures of the aforementioned applications are hereby incorporated by reference in their entireties.

TECHNICAL FIELD

This application relates to the field of computing technologies, and in particular, to a data processing method, apparatus, and device, and a computer-readable storage medium.

BACKGROUND

With continuous development of high-performance computing (HPC) and artificial intelligence (AI) technologies, a plurality of new applications emerge. Users are increasingly pursuing ultimate execution efficiency and performance in various application scenarios. Therefore, more and more applications use aggregation communication to replace massive point-to-point operations, to improve running performance of the applications.

Aggregation communication, also referred to as collective communication, specifically refers to completing specific communication operations in a group of processes. The specific communication operations may include operations such as broadcast, gather, and reduction. Compared with point-to-point communication, aggregation communication can effectively improve performance of message passing.

For aggregation communication, the industry further proposes the scalable hierarchical aggregation and reduction protocol (SHARP), to improve performance of aggregation communication. Specifically, SHARP supports offloading an aggregation operation from a computing node to a switching network, for example, a switch, and data does not need to be sent between computing nodes for a plurality of times. In this way, an overall data amount of the aggregation operation on a network is reduced, and time for performing the aggregation operation is shortened.

However, when the aggregation operation is offloaded from the computing node to the switching network, aggregation is usually performed on the switch in a tree manner. Therefore, aggregation efficiency is low. In addition, bandwidth resources are not fully utilized, resulting in low resource utilization.

SUMMARY

This application provides a data processing method. In the method, data is aggregated by using top nodes in a plurality of groups of an all to all structure that are included in a computing cluster, and this operation is not limited to being performed by a root node, to improve aggregation efficiency. In addition, in the method, more top nodes may participate in aggregation, bandwidth resources are fully utilized, and resource utilization is improved. This application further provides an apparatus, a device, a computer-readable storage medium, and a computer program product corresponding to the foregoing method.

According to a first aspect, this application provides a data processing method. The method is applied to a computing cluster. The computing cluster includes a plurality of groups of an all to all structure. Each group is actually a subnet for implementing intra-group communication. The so-called all to all means that there is at least one direct link between each group and each of other groups in the computing cluster. In this way, a length of the link between the groups can be further shortened, thereby implementing low-latency communication.

Each group includes a switching node and a computing node. The computing node is a computer device having a computing capability. For example, the computing node may be a terminal or a server. The terminal includes but is not limited to a desktop computer, a notebook computer, a tablet computer, or a smartphone. The switching node is a device having a data forwarding function in a network. For example, the switching node may be a switch or a router.

A switching node that is in each group and that is configured to communicate with another group is referred to as a top node. A computing node in each group is referred to as a leaf node. In some possible implementations, the group may further include a switching node used for intra-group communication, and the switching node may be connected to the leaf node and the top node, to implement intra-group communication. Therefore, the switching node used for intra-group communication may be referred to as an intermediate node. An intermediate node in one group is specifically a switching node other than a top node in the group.

The top node, the intermediate node, and the leaf node are nodes divided based on levels of the nodes in the group. In some possible implementations, a level relationship of the nodes may be further described by using a parent node and a child node. In one group, all nodes except a top node have parent nodes, and all nodes except a leaf node have child nodes.

For ease of description, this application is described by using an example in which the computing cluster includes a first group and a second group. The first group is any one of the plurality of groups of the all to all structure, and the second group is a group other than the first group in the plurality of groups of the all to all structure.

The first group includes a first top node, and the second group includes a second top node. The first top node is a switching node that is in the first group in which the first top node is located and that is configured to communicate with the second top node in the second group. The second top node is a switching node that is in the second group and that is configured to communicate with the first group. The first top node receives first data sent by the child node, and receives second data sent by the second top node. Then, the first top node aggregates the first data and the second data.

In the method, a plurality of top nodes all participate in aggregation communication, and perform aggregation offloading. This operation is not limited to being performed by a root node. In this way, aggregation efficiency can be improved. In addition, the plurality of top nodes participate in aggregation communication, so that resources can be prevented from being idle, network resources are fully utilized, and resource utilization is improved.

In some possible implementations, the first top node may receive a plurality of pieces of first data sent by a plurality of child nodes. Correspondingly, the first top node may first aggregate the plurality of pieces of first data sent by the child nodes, and then the first top node aggregates the second data and data obtained by aggregating the plurality of pieces of first data, to obtain third data.

A result obtained by aggregating the plurality of pieces of first data by the first top node may be provided to the second top node, so that the second top node directly performs aggregation based on the result and the second data, to obtain the third data. In this way, the top nodes in the plurality of groups aggregate data, to improve aggregation efficiency and improve resource utilization.

In some possible implementations, the first top node may send, to the second top node, the data obtained by aggregating the plurality of pieces of first data. In this way, the second top node does not need to aggregate the plurality of pieces of first data any more. Therefore, a quantity of aggregation times can be reduced, aggregation efficiency is improved, and a waste of resources is avoided.

In some possible implementations, the first top node may send the data to the second top node in any one of the following manners: all to all, ring, and recursive doubling.

The all to all manner means that each top node sends data to all top nodes directly connected to the top node, and may be specifically sending the data obtained by aggregating the plurality of pieces of first data. The ring manner means that each top node sends data to adjacent top nodes in sequence. The data sent by each top node includes data aggregated by the top node and received data aggregated by the adjacent top node. Each top node knows an amount of data that needs to be aggregated. When the top node receives all to-be-aggregated data, the top node may stop sending the data. The recursive doubling manner means that every two nodes send data to each other, and then each node aggregates the data. Then, every two groups of nodes exchange aggregated data, and each group of nodes includes the foregoing two nodes. The rest can be deduced by analogy until each node aggregates all data.

Regardless of whether the all to all manner, the ring manner, or the recursive doubling manner is used, a top node in each group can obtain all the to-be-aggregated data, and the top node in the group may aggregate the data. This improves aggregation efficiency, improves a participation rate of the top node, and further improves resource utilization.

In some possible implementations, the child node includes a switching node that is in the first group and that is directly connected to the first top node. Correspondingly, the first data includes partially aggregated data, and the third data is fully aggregated data. The partially aggregated data is data obtained by aggregating a part of the to-be-aggregated data, and the fully aggregated data is data obtained by aggregating all the to-be-aggregated data.

In some possible implementations, the child node includes a computing node that is in the first group and that is directly connected to the first top node, the first data includes non-aggregated data, and the third data is fully aggregated data. The non-aggregated data is data that has not been aggregated in the to-be-aggregated data. The non-aggregated data is data provided by the leaf node.

In some possible implementations, before receiving the first data sent by the child node, the first top node may further first join a communication domain. An aggregation topology is defined in the communication domain, and the aggregation topology describes leaf nodes that provide to-be-aggregated data and an intermediate node and a top node that aggregate the data. The aggregation topology may be the same as a physical topology, or may be different from the physical topology. The data of the leaf nodes may be aggregated based on the aggregation topology. When the aggregation topology is the same as the physical topology, node utilization may reach a maximum value. In this way, data aggregation efficiency and resource utilization in a subsequent aggregation process may be improved.

In some possible implementations, the aggregation topology may include a root node, the root node is a control node, and top nodes in different groups are level-2 nodes under the root node. The first top node may send a domain joining request to the control node, to request to join the communication domain. After receiving all domain joining requests, the control node may generate a domain joining response. Then, the first top node receives the domain joining response sent by the control node, where the domain joining response indicates that the first top node successfully joins the communication domain. In this way, the first top node may aggregate data in a service procedure, to improve aggregation efficiency and resource utilization.

In some possible implementations, the control node may be a node independent of the computing node and the switching node, or may be one node of switching nodes. When the control node is an independent node, stability of the computing cluster can be improved. When the control node is one of the switching nodes, existing resources can be fully utilized, thereby avoiding a waste of resources.

In some possible implementations, the aggregation topology may alternatively include no root node. The first top node may receive a domain joining request sent by a third top node. When a domain identifier in the domain joining request is included in a domain identifier list of the first top node, the first top node adds a node identifier of the first top node to a node identifier list of the corresponding communication domain. In this way, the first top node may aggregate data in a service procedure, to improve aggregation efficiency and resource utilization.

In some possible implementations, the third top node is a node that is in second top nodes and that is right-connected or left-connected to the first top node, or a node that is in the second top nodes and that is directly connected to the first top node.

Specifically, each top node may receive a domain joining request sent by a left-connected (or right-connected) top node. If a domain identifier in the domain joining request is in a domain identifier list of the top node, a node identifier of the top node is added to a node identifier list of a corresponding communication domain, and then the domain joining request is forwarded to a next top node; otherwise, the domain joining request is directly forwarded. When a top node receives a domain joining request sent by the top node, the top node discards the domain joining request and stops forwarding the request.

Certainly, the top node may alternatively receive the domain joining request. If a domain identifier in the domain joining request is in a domain identifier list of the top node, a node identifier of the top node is added to a node identifier list of a communication domain; otherwise, the domain joining request is discarded. When a total quantity of child nodes corresponding to domain joining requests received by top nodes is equal to a quantity of leaf nodes in an entire communication domain, creation of the communication domain is completed, and all the leaf nodes and all the top nodes join the communication domain.

In some possible implementations, a topology of the computing cluster is a dragonfly network topology. When performing aggregation communication, the computing node in the computing cluster may construct an aggregation topology based on the dragonfly network topology, and perform aggregation based on the aggregation topology.

Final aggregation is not limited to being performed on the root node. In this way, aggregation efficiency and node resource utilization may be improved.

According to a second aspect, this application provides a data processing apparatus. The apparatus includes each module configured to perform the data processing method in any one of the first aspect or the possible implementations of the first aspect.

According to a third aspect, this application provides an electronic device, where the electronic device includes a processor and a memory. The processor and the memory communicate with each other. The memory is configured to store computer instructions. The processor is configured to perform, according to the computer instructions, the data processing method in any one of the first aspect or the implementations of the first aspect of this application.

According to a fourth aspect, this application provides a computer-readable storage medium. The computer-readable storage medium stores instructions; and when the instructions are run on a computer, the computer is enabled to perform the data processing method in any one of the first aspect or the implementations of the first aspect.

According to a fifth aspect, this application provides a computer program product including instructions. When the computer program product runs on a computer, the computer is enabled to perform the data processing method in any one of the first aspect or the implementations of the first aspect.

In this application, based on implementations according to the foregoing aspects, the implementations may be further combined to provide more implementations.

BRIEF DESCRIPTION OF DRAWINGS

To describe technical methods in embodiments of this application more clearly, the following briefly describes the accompanying drawings for embodiments.

DESCRIPTION OF EMBODIMENTS

Figure 1:
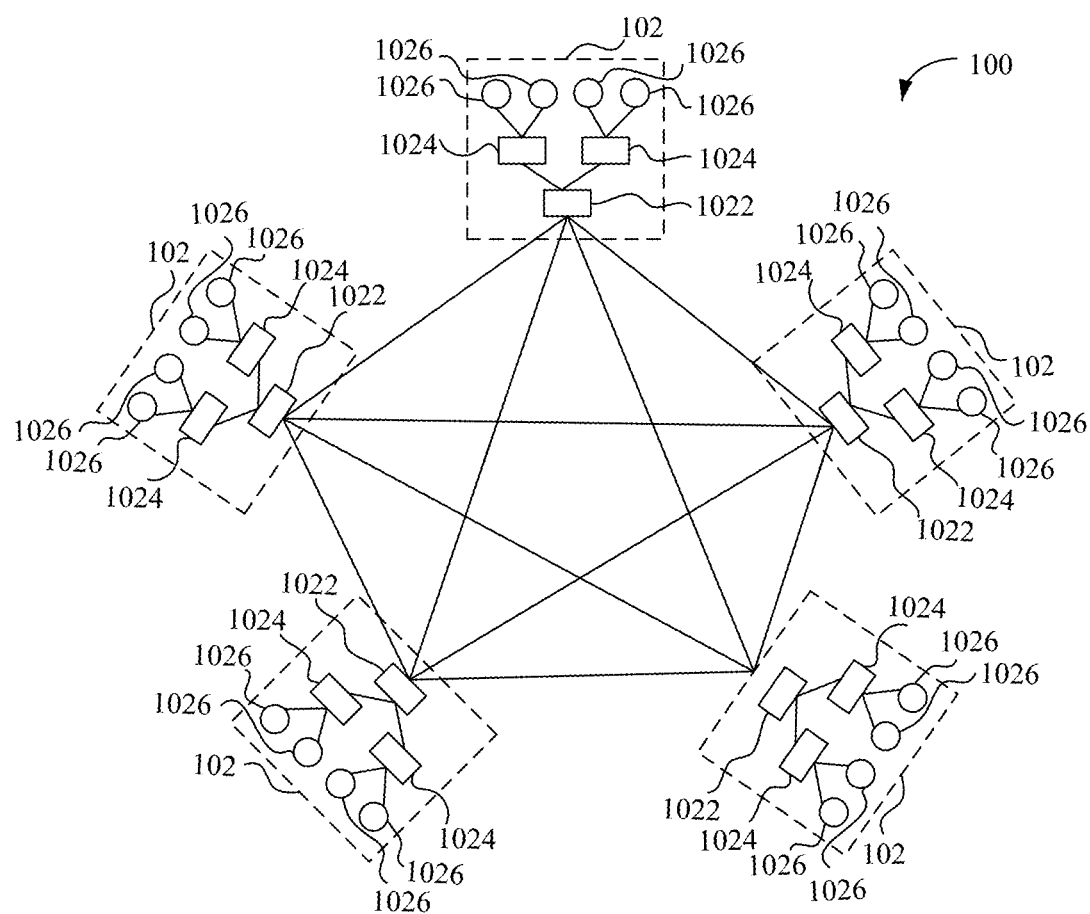
FIG. 1 is a system architectural diagram of a dragonfly network according to an embodiment of this application.

For ease of understanding, some technical terms used in embodiments of this application are first described.

High-performance computing refers to performing computing by using aggregation computing capabilities of a large quantity of processing units, to resolve complex problems, such as weather prediction, oil exploration, and nuclear explosion simulation. The aggregation computing capabilities of the large quantity of processing units may be aggregation computing capabilities of a plurality of processors in a single machine, or may be aggregation computing capabilities of a plurality of computers in a cluster.

Aggregation computing of the plurality of computers in the cluster is implemented based on aggregation communication. Aggregation communication is also referred to as collective communication. In a computing system including a plurality of computers, operations involving global data migration and global control between a group of processors are referred to as aggregation communication. Aggregation communication has a large quantity of important applications in the field of parallel distributed computing. In many cases, aggregation communication is more important than point-to-point communication. Compared with point-to-point communication, aggregation communication can greatly improve performance of a message passing program.

Commonly used aggregation communication middleware in the industry includes a message passing interface (MPI). The MPI defines a portable programming interface for a user to invoke, to implement a corresponding aggregation communication operation. The aggregation communication operation specifically includes any one or more of broadcast, barrier, reduction, scatter, gather, and the like.

Based on a flow direction of a data flow in aggregation communication, aggregation communication operations may be classified into a rooted communication operation and a non-rooted communication operation. The rooted communication operation is an operation that originates from a specific node (that is, a root node) or passes a message to the root node, and specifically includes operations such as broadcast, gather, scatter, and reduction. The non-rooted communication operation is a communication operation other than the rooted communication operation in the collective communication operations, and specifically includes all gather, all scatter, all reduction, and barrier.

During aggregation communication, synchronization and communication between different computers may be implemented by using an interconnection network. The interconnection network may be a dragonfly network. The dragonfly network includes a plurality of groups, and each group is actually a subnet for implementing intra-group communication. Groups are connected through links, and each of the links between the groups is narrow. This is similar to a wide body and narrow wings of a dragonfly. Therefore, the network is referred to as a dragonfly network. Because the narrow links are used between the groups included in the dragonfly network, a quantity of global links can be greatly reduced, thereby reducing networking costs.

Further, the groups in the dragonfly network may be connected in an all to all manner. The so-called all to all means that there is at least one direct link between each group and each of other groups in the dragonfly network. In this way, a link length can be further shortened, thereby implementing low-latency communication.

Next, a dragonfly network (also referred to as a dragonfly+ network) in which groups are connected in an all to all manner is used as an example to describe in detail an architecture of the dragonfly network. The dragonfly network is of a network topology structure. Groups in the dragonfly network are large in scale, and there are a large quantity of groups that can be connected. However, each of links between the groups is narrow This is similar to a structure of a dragonfly with a wide body and narrow wings. Therefore, the network is referred to as a dragonfly network. Because the narrow links are used between the groups in the dragonfly network, a quantity of global links can be greatly reduced, thereby reducing system costs. Therefore, the network is favored. To achieve an objective that a global step is 1, the groups in the dragonfly network are of an all to all structure. In addition, to reduce a network diameter, the groups are connected by using as small steps as possible, and is usually of the all to all structure or a flat butterfly structure.

Refer to a schematic architectural diagram of a dragonfly network shown in FIG. 1. The dragonfly network 100 includes a plurality of groups 102 of an all to all structure, and each group 102 includes a switching node and a computing node. The computing node is a computer device having a computing capability. For example, the computing node may be a terminal or a server. The terminal includes but is not limited to a desktop computer, a notebook computer, a tablet computer, or a smartphone. The switching node is a device having a data forwarding function in a network. For example, the switching node may be a switch or a router. The groups of the all to all structure means that there is a connection relationship between different groups, so that switching nodes or computing nodes in the groups can communicate with each other through an interconnected network structure.

A switching node that is in each group 102 and that is configured to communicate with another group is referred to as a top node 1022. A computing node in each group 102 is referred to as a leaf node 1026. In some possible implementations, the group 102 may further include a switching node used for intra-group communication, and the switching node may be connected to the leaf node and the top node, to implement intra-group communication. Therefore, the switching node used for intra-group communication may be referred to as an intermediate node 1024. An intermediate node 1024 in one group 102 is specifically a switching node other than a top node 1022 in the group 102.

The top node 1022, the intermediate node 1024, and the leaf node 1026 are divided based on levels of the nodes in the network. In some possible implementations, a level relationship of the nodes may be further described by using a parent node and a child node. In one group 102, all nodes except a top node 1022 have parent nodes, and all nodes except a leaf node 1026 have child nodes.

A child node of one top node 1022 is a node that is in a group 102 in which the top node 1022 is located and that is directly connected to the top node 1022. A node that is in one group 102 and that is directly connected to a top node 1022 may be an intermediate node 1024, or may be a leaf node 1026. Correspondingly, a parent node of the leaf node 1026 may be the intermediate node 1024 or the top node 1022.

A child node of one intermediate node 1024 is a node, except a top node 1022, that is in a group 102 in which the intermediate node 1024 is located and that is directly connected to the intermediate node 1024. A node, except a top node 1022, that is in one group 102 and that is directly connected to an intermediate node 1024 may be another intermediate node 1024, or may be a leaf node 1026. Correspondingly, a parent node of the intermediate node 1024 may be the another intermediate node 1024 or the top node 1022.

FIG. 1 is merely described by using an example in which one group 102 includes one top node 1022, child nodes of the top node 1022 are a plurality of intermediate nodes 1024, and child nodes of the intermediate node 1024 are a plurality of leaf nodes 1026. In another possible implementation of this embodiment of this application, the group 102 may include a plurality of top nodes 1022.

Figure 2:
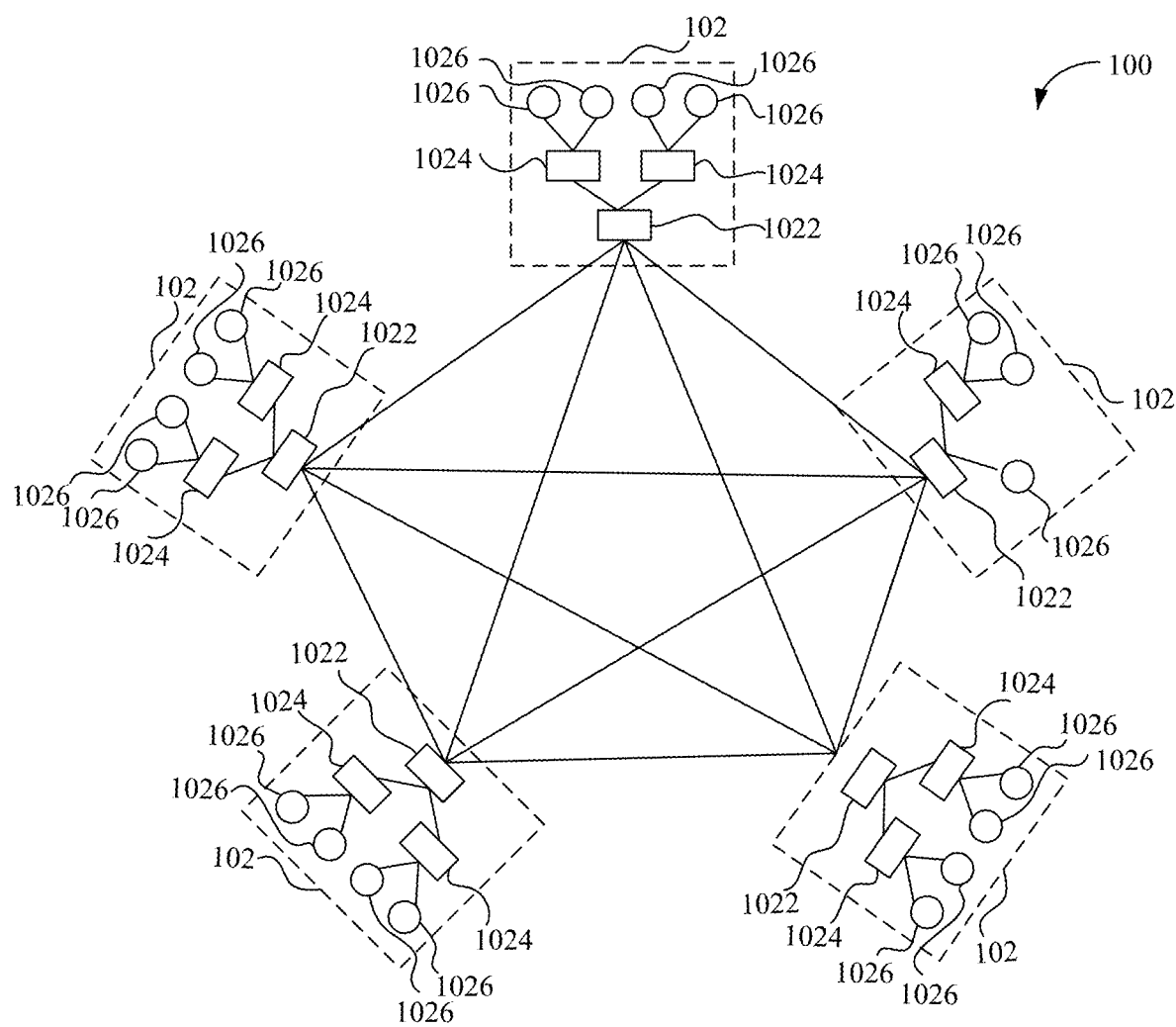
FIG. 2 is a system architectural diagram of a dragonfly network according to an embodiment of this application.
Figure 3:
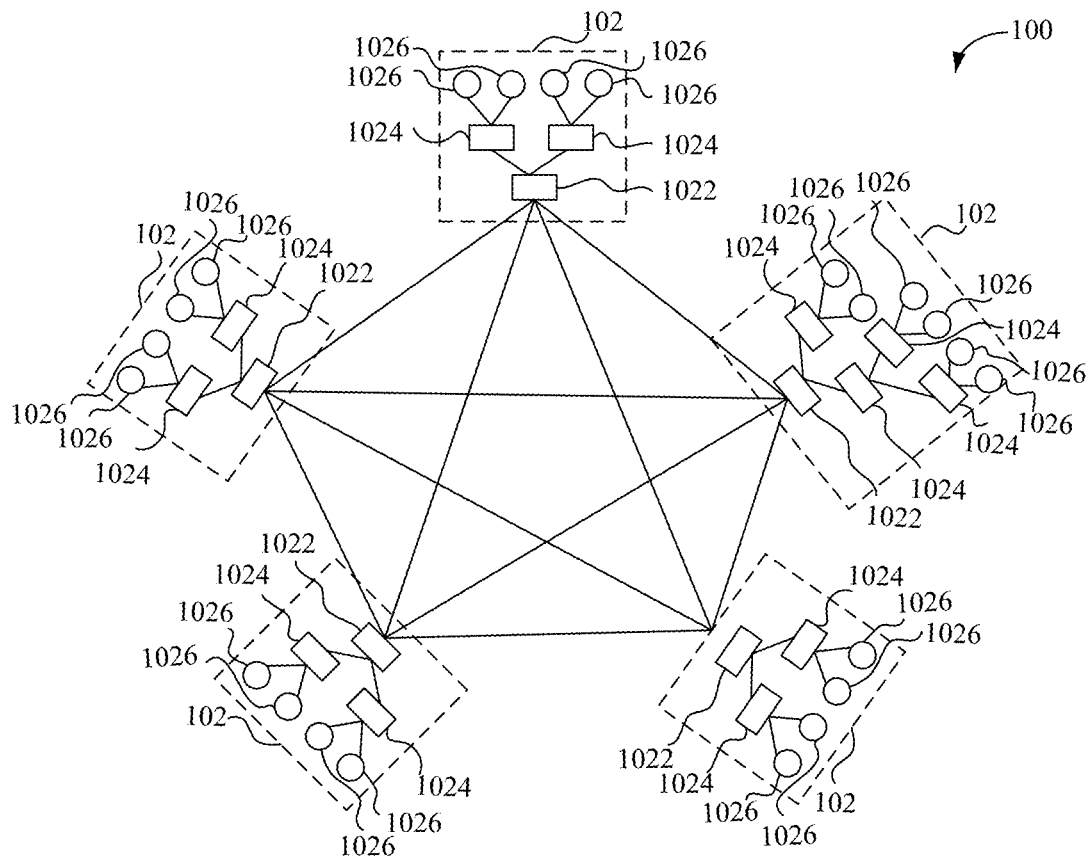
FIG. 3 is a system architectural diagram of a dragonfly network according to an embodiment of this application.

In some possible implementations, as shown in FIG. 2, the child node of the top node 1022 may further include the leaf node 1026. In some other possible implementations, as shown in FIG. 3, the child node of the intermediate node 1024 may further include another intermediate node 1024. This is not limited in this embodiment of this application.

The switching node (including the top node 1022 and the intermediate node 1024) may not only be configured to forward data but also be configured to process data. For example, the switching node may be further configured to: when a plurality of computing nodes perform aggregation communication, aggregate data of the computing nodes.

In some computing tasks, to-be-aggregated data on the computing nodes needs to be aggregated, and a final aggregation result needs to be distributed to the computing nodes. The to-be-aggregated data may be specifically data of a data type corresponding to the computing task, and the data type corresponding to the computing task includes but is not limited to: integer, floating-point, and Boolean. To be specific, the to-be-aggregated data may be integer data, floating-point data, or Boolean data.

For example, in a weather prediction task, the to-be-aggregated data may be at least one of a temperature, a humidity, a wind direction, and a wind speed. Data types of the temperature, the humidity, and the wind speed may be integer or floating-point. The wind direction may be represented by an included angle between the wind and a specified direction such as (northbound). Therefore, a data type of the wind direction may be floating-point. For another example, in an oil exploration task, the to-be-aggregated data may be at least one of gravities, magnetism, and resistivities in different geographical locations. Data types of the gravity and the magnetism may be integer, and a data type of the resistivity may be floating-point. In consideration of accuracy, the data types of the gravity and the magnetism may alternatively be floating-point.

Aggregation is a process of combining a plurality of pieces of to-be-aggregated data on the computing nodes to obtain one piece of data. The process of combining the plurality of pieces of to-be-aggregated data may be specifically performing a mathematical formula operation on the plurality of pieces of to-be-aggregated data, for example, adding the plurality of pieces of to-he-aggregated data, where an obtained sum is an aggregation result; or for another example, adding the plurality of pieces of to-be-aggregated data, and finally averaging the data, where an obtained average value is an aggregation result.

As shown in FIG. 1 to FIG. 3, when performing aggregation communication, the leaf node 1026 may further offload an aggregation operation to switching nodes, for example, the intermediate node 1024 and the top node 1022. For example, when performing an all reduction operation, for example, all reduction summation, a plurality of leaf nodes 1026 may offload the summation operation to a corresponding intermediate node 1024 and top node 1022.

However, the switching node usually performs aggregation in a tree manner. Specifically, one of top nodes 1022 is used as a root node, and the root node is used as a final node of aggregation to perform layer-by-layer aggregation. This aggregation method is inefficient. In addition, a large quantity of network resources (such as bandwidth resources) are not fully utilized, resource utilization is reduced, and aggregation costs increase.

An embodiment of this application provides a data processing method. The method is applied to a computing cluster. A network topology of the computing cluster may be a dragonfly network topology structure, for example, the dragonfly+ network topology structure shown in FIG. 1 to FIG. 3. The computing cluster includes a plurality of groups of an all to all structure, and each group includes a switching node and a computing node. For ease of description, this application is described by using an example in which the computing cluster includes a first group and a second group. The first group is any one of the plurality of groups of the all to all structure, and the second group is a group other than the first group in the plurality of groups of the all to all structure.

The first group includes a first top node, and the second group includes a second top node. The first top node is a switching node that is in the first group in which the first top node is located and that is configured to communicate with the second top node in the second group. The second top node is a switching node that is in the second group and that is configured to communicate with the first group. The first top node receives first data sent by a child node, and receives second data sent h the second top node. Then, the first top node aggregates the first data and the second data.

In the method, a plurality of top nodes 1022 all participate in aggregation communication, and perform aggregation offloading. This operation is not limited to being performed by a root node. In this way, aggregation efficiency can be improved. In addition, the plurality of top nodes 1022 participate in aggregation communication, so that resources can be prevented from being idle, network resources are fully utilized, and resource utilization is improved.

For ease of understanding, the following describes the technical solutions of this application with reference to the data processing method in the dragonfly network shown in FIG. 1 to FIG. 3.

Refer to the system architectural diagram of the dragonfly network shown in FIG. 1 to FIG. 3. When different leaf nodes 1026 perform aggregation communication, an intermediate node 1024 and a top node 1022 that are connected to the leaf node may also perform aggregation calculation, to complete aggregation communication. Specifically, the leaf node 1026, the intermediate node 1024, and the top node 1022 may first join a communication domain.

Different computing tasks may correspond to different communication domains. An aggregation topology is defined in the communication domain, and the aggregation topology describes leaf nodes 1026 that provide to-be-aggregated data and an intermediate node 1024 and a top node 1022 that aggregate the data. The aggregation topology may be the same as a physical topology, or may be different from the physical topology. The data of the leaf nodes 1026 may be aggregated based on the aggregation topology. When the aggregation topology is the same as the physical topology, node utilization may reach a maximum value. In this way, data aggregation efficiency and resource utilization in a subsequent aggregation process may be improved.

After each node participating in aggregation communication joins the communication domain, leaf nodes 1026 in each group 102 may send to-be-aggregated data to parent nodes of the leaf nodes 1026, and the parent node may preliminarily aggregate the data sent by the leaf nodes 1026. The parent node of the leaf node 1026 may be the intermediate node 1024 or the top node 1022. When the parent node of the leaf node 1026 is the intermediate node 1024, the intermediate node 1024 may further send preliminarily aggregated data to a parent node, so that the parent node can perform further aggregation. The parent node of the intermediate node 1024 may be another intermediate node 1024 or the top node 1022. When the parent node of the intermediate node 1024 is the another intermediate node 1024, the intermediate node 1024 may send further aggregated data to the another intermediate node 1024, so that the another intermediate node 1024 can aggregate the further aggregated data again.

Correspondingly, the top node 1022 in each group 102 may receive first data sent by a child node. When the child node is the leaf node 1026, the first data may include data of the leaf node 1026, and the data is non-aggregated data. The non-aggregated data is data that has not been aggregated in a plurality of pieces of to-be-aggregated data. When the child node is the intermediate node 1024, the first data may include data obtained by aggregating data of some leaf nodes 1026, and the data is partially aggregated data.

The top node 1022 in each group 102 may further receive second data sent by a top node 1022 in another group. The second data is data obtained by the top node 1022 in the another group 102 based on the data of the leaf node 1026 in the group 102. When the group 102 includes a plurality of leaf nodes, the second data may be data obtained by aggregating data of the leaf nodes 1026 in the group. In other words, the second data may be partially aggregated data. In some embodiments, when one group 102 includes only one leaf node 1026, the second data may alternatively be data of the leaf node 1026. In other words, the second data may alternatively be non-aggregated data.

The top node 1022 in each group 102 may aggregate the first data and the second data, to obtain third data. The third data is data obtained by aggregating all to-be-aggregated data corresponding to a computing task, and the third data is also referred to as fully aggregated data.

In some possible implementations, as shown in FIG. 1 to FIG. 3, the top node 1022 includes a plurality of child nodes, and the top node 1022 may receive first data separately sent by the plurality of child nodes. Correspondingly, when aggregating the first data and the second data, the top node 1022 may first aggregate the plurality of pieces of first data sent by the plurality of child nodes, and then aggregate the second data and data obtained by aggregating the plurality of pieces of first data, to obtain the third data.

Each top node 1022 may send, to a top node 1022 in another group, the data obtained by aggregating the first data, so that the top node 1022 can aggregate all the to-be-aggregated data. In this way, each top node 1022 participates in data aggregation, so that aggregation efficiency and resource utilization are improved.

Because the child nodes of the top node 1022 are different, the first data may be classified into the following three cases.

In a first case, as shown in FIG. 1, all the child nodes of the top node 1022 are intermediate nodes 1024, and correspondingly, all the first data may be partially aggregated data.

In a second case, as shown in FIG. 2, the child nodes of the top node 1022 include the intermediate node 1024 and the leaf node 1026, and correspondingly, the first data may include partially aggregated data and non-aggregated data.

In a third case, all the child nodes of the top node 1022 are leaf nodes 1026, and correspondingly, all the first data is non-aggregated data.

With reference to the accompanying drawings, the following describes in detail specific implementation of the data processing method provided in embodiments of this application from a perspective of the first top node. Refer to a flowchart of a data processing method shown in FIG. 4. The method includes the following steps.

S402: A first top node receives first data sent by a child node.

In some computing tasks, to-be-aggregated data on computing nodes needs to be aggregated, and a final aggregation result needs to be distributed to the computing nodes. The to-be-aggregated data may be specifically data of a data type corresponding to the computing task, and the data type corresponding to the computing task includes but is not limited to: integer, floating-point, and Boolean. To be specific, the to-be-aggregated data may be integer data, floating-point data, or Boolean data.

Aggregation is a process of combining a plurality of pieces of to-be-aggregated data on the computing nodes to obtain one piece of data. The process of combining the plurality of pieces of to-be-aggregated data may be specifically performing a mathematical formula operation on the plurality of pieces of to-be-aggregated data, for example, adding the plurality of pieces of to-be-aggregated data, where an obtained sum is an aggregation result; or for another example, adding the plurality of pieces of to-be-aggregated data, and finally averaging the data, where an obtained average value is an aggregation result.

In this embodiment, the process of aggregating the to-be-aggregated data on the computing nodes is offloaded to a switching node. A data processing process in a first group is used as an example for description. Specifically, if a first top node in the first group has a child node, the first top node may receive first data sent by the child node. The first data may vary with different computing tasks. For example, in a weather prediction task, the first data may be a temperature, a humidity, a wind direction, and/or a wind speed. For another example, in an oil exploration task, the first data may be one or more of a gravity, magnetism, a resistivity, and the like.

When the child node of the first top node includes an intermediate node, the intermediate node may aggregate to-be-aggregated data on leaf nodes (the computing nodes), to obtain first data, where the first data is partially aggregated data. When the child node of the first top node includes a leaf node, to-be-aggregated data on the leaf node is first data, where the first data is non-aggregated data. The child node of the first top node may send the first data to the first top node, for example, send the foregoing partially aggregated data and/or non-aggregated data, so that the first top node can further aggregate the first data to obtain a final aggregation result.

S404: The first top node receives second data sent by a second top node.

The second data is data obtained by the second top node in a second group based on data sent by a child node of the second top node. The second data may vary with different computing tasks. For example, in a weather prediction task, the second data may be a temperature, a humidity, a wind direction, and/or a wind speed. For another example, in an oil exploration task, the second data may be one or more of a gravity, magnetism, a resistivity, and the like. The first data and the second data are data corresponding to a data type of a same computing task. For example, the first data and the second data each may be the temperature or the humidity.

The second data may be non-aggregated data, or may be partially aggregated data. When the second top node is connected to only one leaf node, for example, directly connected to one leaf node, or connected to one leaf node by using an intermediate node, the second data is non-aggregated data, and is specifically data on the leaf node. When the second top node is (directly or indirectly) connected to a plurality of leaf nodes, the second data is partially aggregated data, and the partially aggregated data is obtained by aggregating data on the leaf nodes connected to the second top node.

Similar to the first top node, the child node of the second top node may include the intermediate node and/or the leaf node. When the child node of the second top node includes the intermediate node, the second top node may further aggregate partially aggregated data sent by intermediate nodes, to obtain the second data. When the child node of the second top node includes the leaf node, the second top node may aggregate non-aggregated data sent by leaf nodes, to obtain the second data. When the child node of the second top node includes the intermediate node and the leaf node, the second top node may further aggregate partially aggregated data sent by the intermediate node and non-aggregated data sent by the leaf node, to obtain the second data.

S406: The first top node aggregates the first data and the second data, to obtain third data.

When the first top node includes only one child node in an aggregation topology, the first top node may receive one piece of first data sent by the child node. Correspondingly, the first top node may directly aggregate the first data and the second data, to obtain the third data.

When the first top node includes a plurality of child nodes in an aggregation topology, the second top node may receive a plurality of pieces of first data sent by the plurality of child nodes. Correspondingly, the first top node may first aggregate the plurality of pieces of first data, and then aggregate the second data and data obtained by aggregating the plurality of pieces of first data, to obtain the third data.

Further, the first top node may send the data to the second top node, so that the second top node can also aggregate the data. Specifically, when the first top node receives only one piece of first data, the first top node may directly send the first data. When the first top node receives a plurality of pieces of first data, the first top node may send, to the second top node, data obtained by aggregating the plurality of pieces of first data. In this way, the second top node does not need to aggregate the plurality of pieces of first data any more. Therefore, a quantity of aggregation times can be reduced, aggregation efficiency is improved, and a waste of resources is avoided.

After obtaining the third data (fully aggregated data) through aggregation, the first top node may further return the third data to the child node of the first top node, to return the third data to a corresponding computing node and complete the computing task.

To make the technical solutions of this application clearer, the following describes in detail specific implementation of the data processing method provided in embodiments of this application from a perspective of a data change with reference to the accompanying drawings.

Figure 5A:
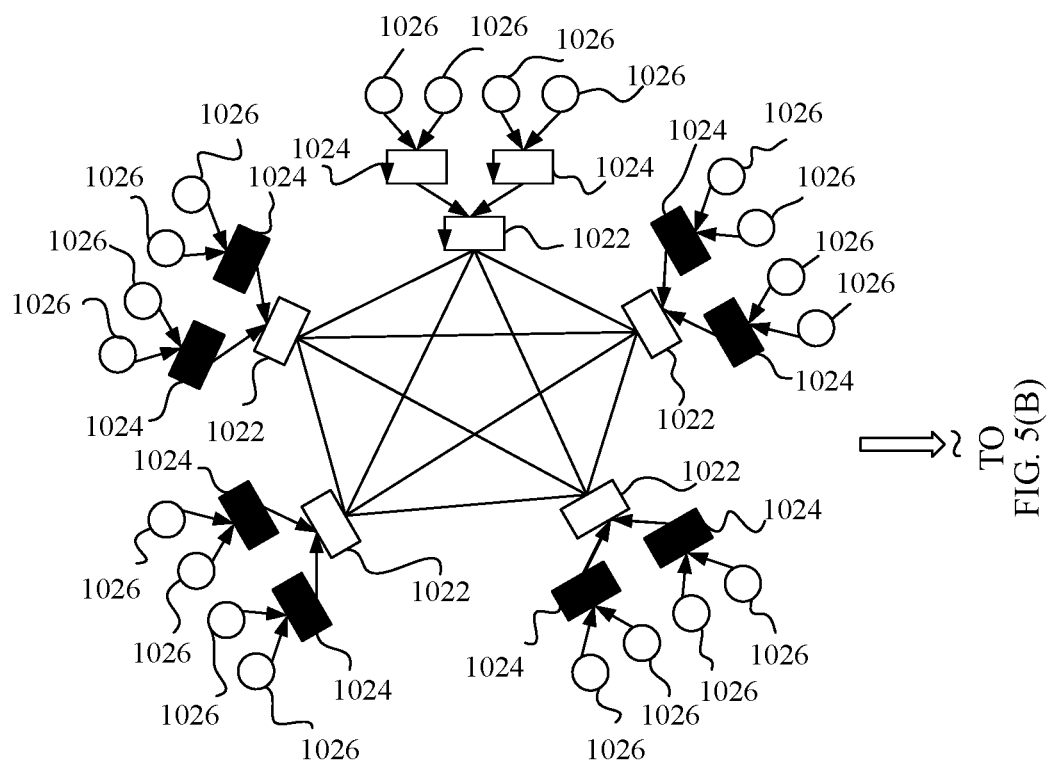
FIG. 5(A), FIG. 5(B), and FIG. 5(C) are a schematic flowchart of a data processing method according to an embodiment of this application.
Figure 5B:
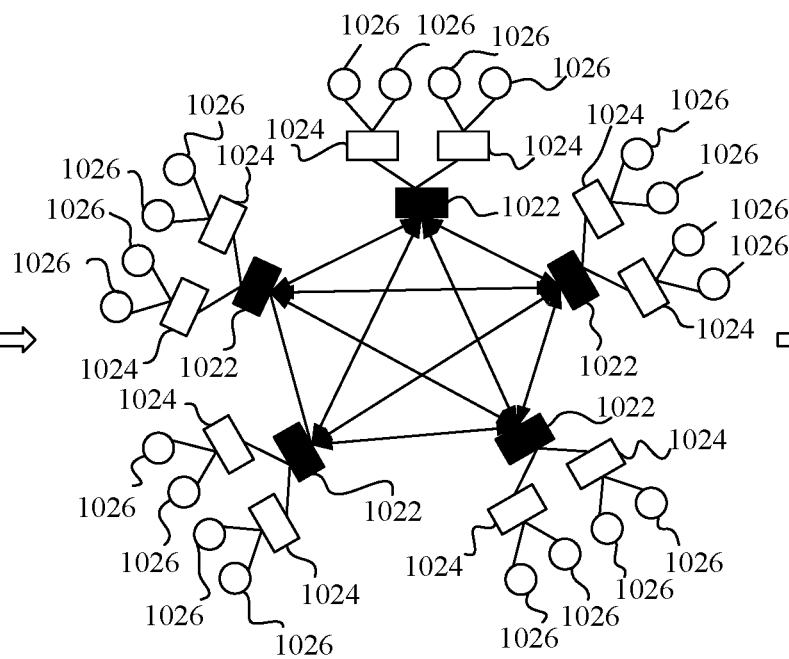
Figure 5C:
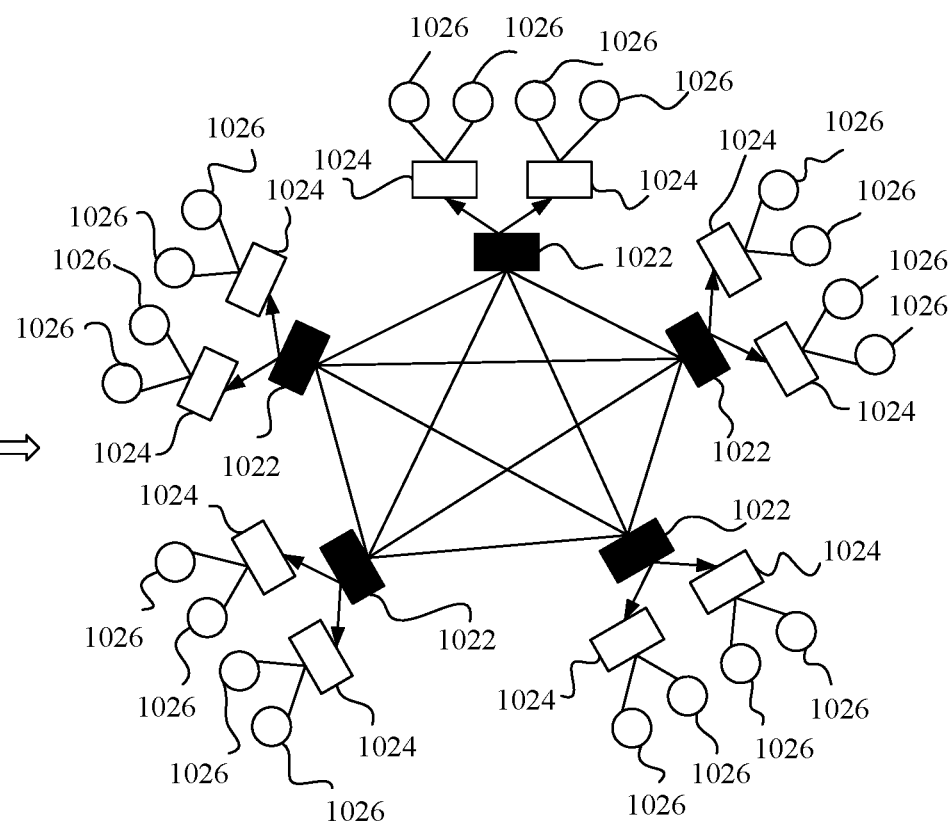

Refer to a schematic flowchart of a data processing method shown in FIG. 5(A), FIG. 5(B), and FIG. 5(C). A circle represents a computing node, that is, represents a leaf node 1026. A square represents a switching node, which specifically includes a top node 1022 and an intermediate node 1024. The leaf node provides to-be-aggregated data, and the switching nodes, for example, the top node 1022 and the intermediate node 1024, each aggregate the to-be-aggregated data, and then forward a final aggregation result to the leaf node 1026.

An intermediate node 1024 in each group may receive to-be-aggregated data sent by leaf nodes 1026 in the group, and the intermediate node 1024 may aggregate the data sent by the leaf nodes 1026, to obtain partially aggregated data. As shown in FIG. 5(A), a black-filled square indicates that the node has aggregated data, for example, the partially aggregated data. The intermediate node 1024 sends the partially aggregated data to the top node 1022. Then, as shown in FIG. 5(B), each top node 1022 aggregates partially aggregated data sent by child nodes (specifically, intermediate nodes 1024) of the top node 1022, and then sends an aggregation result to another top node 1022. In this way, each top node 1022 may aggregate an aggregation result of the node and an aggregation result of another top node 1022, to obtain a final aggregation result. As shown in FIG. 5(C), each top node 1022 sends a final aggregation result to a child node (specifically, the intermediate node 1024) of the top node 1022. The intermediate node 1024 may return the final aggregation result to a child node (specifically, the leaf node 1026) of the intermediate node 1024.

If aggregation is performed in a tree manner, one of a plurality of top nodes 1022 is determined as a root node. After step (A) is performed, each top node 1022 aggregates partially aggregated data received by the top node 1022, to obtain an aggregation result. Then, top nodes 1022 other than the root node in the plurality of top nodes 1022 send aggregation results to the root node, and the root node aggregates the aggregation results, to obtain a final aggregation result. Then, the root node sends the final aggregation result to the top nodes 1022 other than the root node in the plurality of top nodes 1022. Then, each top node 1022 performs step (C) to send the final aggregation result to the leaf node 1026.

It can be learned that, according to the aggregation method in this embodiment of this application, one round of aggregation can be reduced, thereby improving aggregation efficiency. In addition, the plurality of top nodes 1022 all participate in aggregation, to prevent resources of some top nodes 1022 from being idle, fully utilize resources of the switching node, and improve resource utilization.

In the embodiment shown in FIG. 5(A), FIG. 5(B), and FIG. 5(C), the top node 1022 sends data to another top node 1022 in an all to all manner, for example, sends data obtained by aggregating the received first data by the top node 1022. An all cross manner means that each top node 1022 sends data to another top node 1022 in a point-to-point manner.

In some possible implementations, the top node 1022 may further send data to another top node 1022 in a ring or recursive doubling manner. The following describes in detail the ring and recursive doubling manners.

The ring manner means that each top node 1022 sends data to adjacent top nodes in sequence. The data sent by each top node 1022 includes data aggregated by the top node 1022 and received data aggregated by the adjacent top node 1022. Each top node 1022 knows an amount of data that needs to be aggregated. When the top node 1022 receives all to-be-aggregated data, the top node may stop sending the data.

For example, a plurality of top nodes 1022 are respectively a top node 1 to a top node 5, and data aggregated by the top nodes 1022 from child nodes is data 1 to data 5. In this case, the top node 1 may send the data 1 to the top node 2, the top node 2 may send the data 1 and the data 2 to the top node 3, the top node 3 may send the data 1, the data 2, and the data 3 to the top node 4, and the top node 4 may send the data 1, the data 2, the data 3, and the data 4 to the top node 5.

The top node 5 may aggregate the data 1, the data 2, the data 3, the data 4, and the data 5. Then, the top node 5 sends the data 2, the data 3, the data 4, and the data 5 to the top node 1. In this way, the top node 1 may aggregate the data 1 to the data 5. The top node 1 sends the data 3, the data 4, and the data 5 to the top node 2. In this way, the top node 2 may aggregate the data 1 to the data 5. The top node 2 sends the data 4 and the data 5 to the top node 3. In this way, the top node 3 may aggregate the data 1 to the data 5. The top node 3 sends the data 5 to the top node 4. In this way, the top node 4 may aggregate the data 1 to the data 5.

Recursive doubling means that every two nodes send data to each other, and then each node aggregates the data. Then, every two groups of nodes exchange aggregated data, and each group of nodes includes the foregoing two nodes. The rest can be deduced by analogy until each node aggregates all data.

Figure 6:
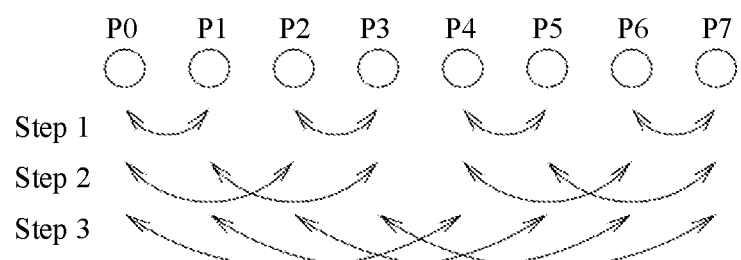
FIG. 6 is a schematic diagram of sending data in a recursive doubling manner according to an embodiment of this application.

For ease of understanding, descriptions are provided below with reference to specific examples. Refer to FIG. 6. A computing cluster includes eight top nodes, which are specifically P0, P1, . . . , and P7. First, P0 and P1 send data to each other, P2 and P3 send data to each other, P4 and P5 send data to each other, and P6 and P7 send data to each other. Then, P0 to P7 each aggregate the data. Then, a group of the nodes P0 and P1 exchange aggregated data with a group of the nodes P2 and P3, and aggregate the exchanged data. For example, P0 and P2 exchange the aggregated data with each other, and each aggregate the exchanged data. P1 and P3 exchange the aggregated data with each other, and each aggregate the exchanged data. Similarly, a group of the nodes P4 and P5 exchange aggregated data with a group of the nodes P6 and P7, and each aggregate the exchanged data. Then, a group of the nodes P0, P1, P2, and P3 exchange aggregated data with a group of the nodes P4, P5, P6, and P7, and each aggregate the exchanged data. For example, P0 and P4 exchange the aggregated data, P1 and P5 exchange the aggregated data, P2 and P6 exchange the aggregated data, P3 and P7 exchange the aggregated data, and P0 to P7 each aggregate the exchanged data. In this way, each top node may aggregate all data to obtain a final aggregation result.

Figure 4:
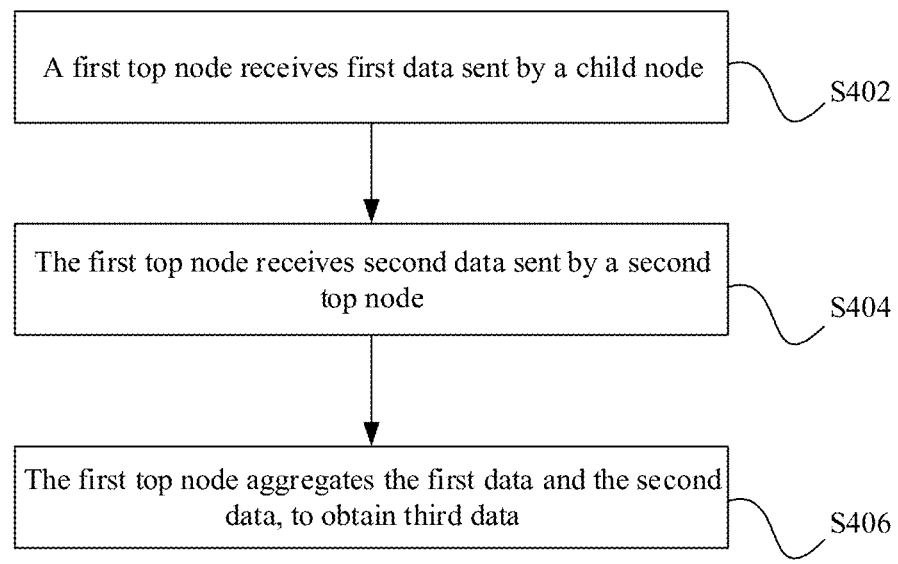
FIG. 4 is a flowchart of a data processing method according to an embodiment of this application.

In the embodiment shown in FIG. 4, the data aggregation process is mainly described from a perspective of a service procedure. Before data aggregation is performed, a control procedure may be further performed, so that a node participating in aggregation can join a communication domain. Therefore, before the first top node receives the first data sent by the child node, the first top node further needs to join the communication domain.

The first top node may join the communication domain in a plurality of implementations. The following separately describes in detail an implementation in which the first top node joins the communication domain in a case in which there is a root node and in a case in which there is no root node.

Figure 7:
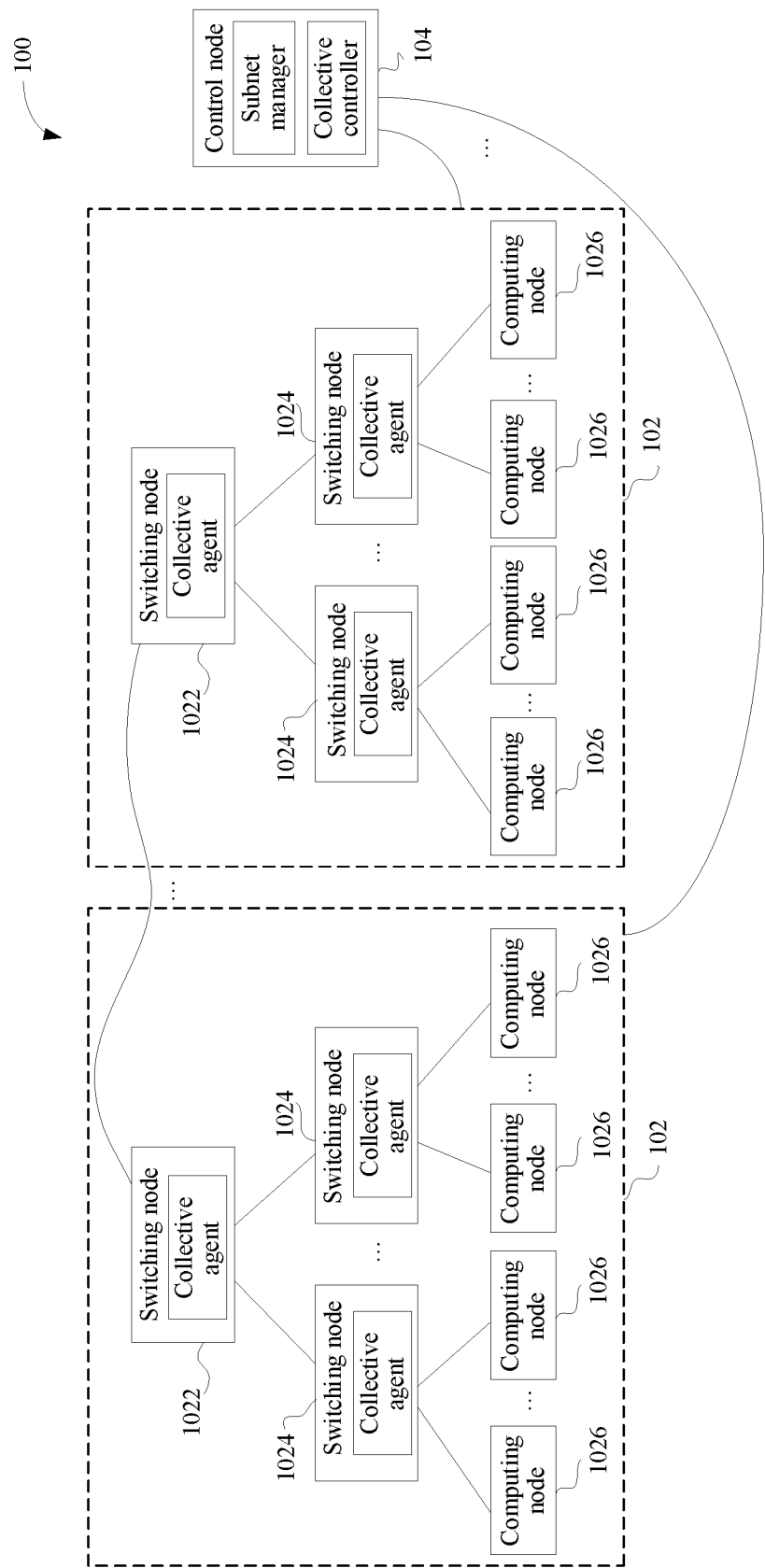
FIG. 7 is a system architectural diagram of a dragonfly network according to an embodiment of this application.

Refer to FIG. 7. A dragonfly network 100 further includes a control node 104, and the control node 104 is independent of a computing node (that is, a leaf node 1026) and a switching node (including a top node 1022 and an intermediate node 1024). The control node 104 includes a subnet manager and a collective controller. The collective controller may collaborate with the subnet manager to monitor an entire life cycle of aggregation communication, and is responsible for topology change sensing, exception monitoring, and resource allocation and recycling. The collective controller may be a software module, or may be a hardware module having the foregoing functions. The switching node (which may be specifically a switch) includes a collective agent. The collective agent may be a software module, or may be a hardware module. The agent is configured to implement a service procedure and a control procedure. The computing node includes a process (which may be specifically an MPI process) of participating in aggregation communication and a collective library. The collective library provides a control plane interface and a data plane interface during running, and is configured to implement interaction with the collective agent and the collective controller.

The control node 104 (which is specifically the collective controller in the control node 104) may read a configuration file, to determine a physical topology of a network, for example, determine that the physical topology of the network is dragonfly+. Then, the control node 104 generates a topology structure of an aggregation tree based on the physical topology, for data aggregation. The control node 104 is a root node of a tree, and interconnected top nodes in different groups are level-2 nodes of a same aggregation tree. The control node 104 notifies, based on the topology structure of the aggregation tree, an actual switch to establish a link, and notifies the top node that the topology is dragonfly+. Then, the control node 104 notifies the top nodes to establish all connections, and this is specifically establishing connections for all physical links between top nodes.

The computing node serving as the leaf node 1026 communicates with the control node 104, to obtain an address of a directly connected switch (which is specifically the collective agent in the switch), and then the computing node sends a domain joining request to the directly connected switch. The domain joining request is used to request to join the communication domain. The domain joining request includes a unique domain identifier. Further, the domain joining request may include a domain size. The domain size may be represented by a quantity of nodes in the communication domain.

The intermediate node 1024 receives the domain joining request, and records information about a child node that sends the domain joining request, for example, a node identifier of the child node. In this way, in the service procedure, the intermediate node 1024 may aggregate data from child nodes (for example, leaf nodes 1026). Then, the intermediate node 1024 continues to send the domain joining request to a parent node.

When receiving the domain joining request, the top node 1022 records the information about the child node that sends the domain joining request, and then sends the domain joining request to the control node 104. After receiving all domain joining requests, the control node 104 may obtain information about all the top nodes, and then the control node 104 may send a domain joining response, where the domain joining response indicates that the top node 1022 successfully joins the communication domain. The top node 1022 receives the domain joining response, and may mark that in the communication domain, communication is performed in an all to all manner. Then, the top node 1022 may reply the domain joining response to a child node of the top node 1022. The rest can be deduced by analogy. The child node continues to reply the domain joining response to the child node of the child node until the leaf node 1026 receives the domain joining response.

In some possible implementations, the switching node may be further used as the control node 104. The control node 104 is a virtual control node, to be specific, a control node that has a corresponding function and that is virtualized from the switching node. During specific implementation, one top node 1022 may be virtualized as the control node 104.

In some possible implementations, the top node 1022 may alternatively join the communication domain without using a root node. The following uses a process in which a first top node joins the communication domain as an example for description.

Specifically, the first top node receives a domain joining request sent by a third top node. When a domain identifier in the domain joining request is included in a domain identifier list of the first top node, the first top node adds a node identifier of the first top node to a node identifier list of the corresponding communication domain.

The third top node may be a node that is in second top nodes and that is right-connected or left-connected to the first top node. An example in which the third top node is a node left-connected to the first top node is used for description. Each top node 1022 receives a domain joining request sent by a left-connected top node 1022. If a domain identifier in the domain joining request is in a domain identifier list of the top node, a node identifier of the top node 1022 is added to a node identifier list of a corresponding communication domain, and then the domain joining request is forwarded to a next top node 1022; otherwise, the domain joining request is directly forwarded. When a top node receives a domain joining request sent by the top node, the top node discards the domain joining request and stops forwarding the request.

In some embodiments, the third top node may alternatively be a node that is in the second top nodes and that is directly connected to the first top node. A top node 1022 receives a domain joining request. If a domain identifier in the domain joining request is in a domain identifier list of the top node 1022, a node identifier of the top node 1022 is added to a node identifier list of a communication domain; otherwise, the domain joining request is discarded. When a total quantity of child nodes corresponding to domain joining requests received by top nodes 1022 is equal to a quantity of leaf nodes in an entire communication domain, creation of the communication domain is completed, and all the leaf nodes 1026 and all the top nodes 1022 join the communication domain.

The following describes in detail the data processing method provided in embodiments of this application with reference to a distributed model training scenario.

Figure 8:
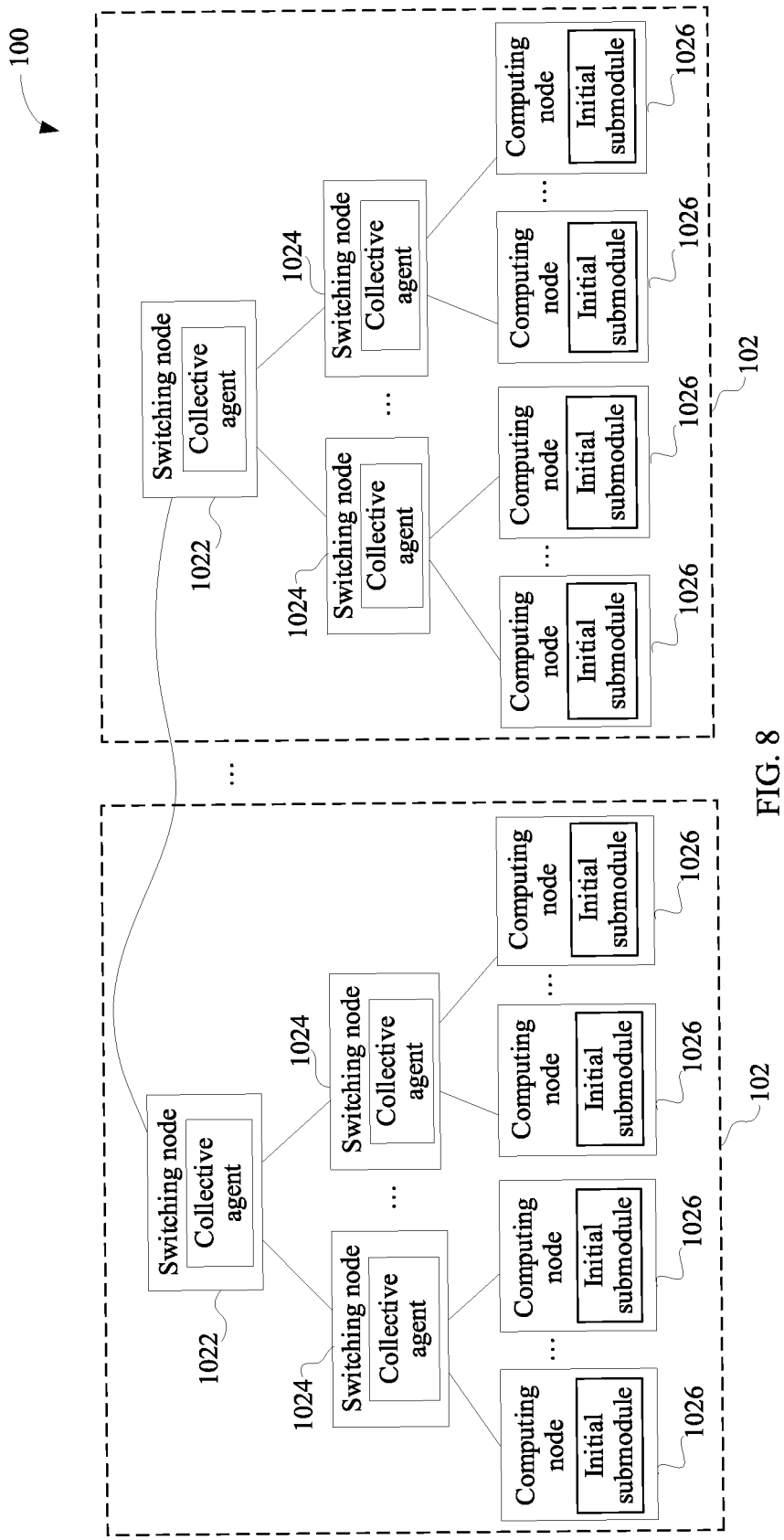
FIG. 8 is a schematic diagram of a distributed model training scenario according to an embodiment of this application.

Refer to a schematic diagram of a distributed model training scenario shown in FIG. 8. As shown in FIG. 8, during model training, distributed model training may be performed by using a dragonfly network 100. Therefore, parallel training may be performed by using a plurality of leaf nodes 1026, to improve training efficiency. In addition, training may be performed by using respective datasets of the plurality of leaf nodes 1026, to protect data privacy.

Specifically, the dragonfly network 100 includes a plurality of groups 102, and each group 102 includes a computing node and a switching node. The computing node in each group 102 is a leaf node 1026 in the group, a switching node that is in the group 102 and that communicates with a switching node in another group 102 is a top node 1022 in the group 102, and a switching node other than the top node 1022 in the group 102 is an intermediate node 1024 in the group 102.

Each leaf node 1026 includes a same initial submodel, and leaf nodes 1026 train the initial submodel by using different training samples, to obtain a gradient of a loss function. Each leaf node 1026 may calculate an average value of gradients through aggregation communication, to update a weight of the initial submodel and obtain a submodel.

Each leaf node 1026 calculates an average value of gradients by using an all reduction interlace function in aggregation communication. Specifically, after each leaf node 1026, and the top node 1022 and the intermediate node 1024 that participate in aggregation communication join a communication domain, the leaf node 1026 sends, to an intermediate node 1024 connected to the leaf node 1026, a gradient of a loss function obtained by training an initial submodel by the leaf node 1026. The intermediate node 1024 performs preliminary aggregation on received gradients, and sends an aggregated gradient to a parent node (the top node 1022 or another intermediate node 1024). When receiving aggregated gradients sent by a plurality of child nodes, the top node 1022 first aggregates the plurality of gradients sent by the child nodes, and then each top node 1022 sends an aggregated gradient to another top node 1022. In this way, each top node 1022 may determine a sum of gradients based on the aggregated gradient of the top node 1022 and the received aggregated gradient of the another top node 1022, and may further determine an average value of the gradients. Each top node 1022 returns the average value of the gradients to a child node of the top node 1022. When the child node is the intermediate node 1024, the intermediate node 1024 returns the average value of the gradients. Each leaf node 1026 updates the initial submodel based on the average value of the gradients, to obtain the submodel, and implement distributed model training.

The foregoing embodiment is described by using an example in which the computing node includes one process of participating in aggregation communication. In some possible implementations, at least one computing node may include a plurality of processes of participating in aggregation communication. Based on this, the computing node may further first aggregate, in the node, data of the plurality of processes of participating in aggregation communication, to obtain partially aggregated data. Then, the computing node sends the partially aggregated data to the switching node for further aggregation.

That the computing node aggregates, in the node, data of the plurality of processes of participating in aggregation communication may be implemented by using a processor of the computing node, for example, a central processing unit (CPU). In some possible implementations, a network interface card of the computing node also includes a processor, and the computing node may further offload, to the network interface card, a process of aggregating the data of the plurality of processes of aggregation communication.

The foregoing describes in detail the data processing method provided in embodiments of this application with reference to FIG. 1 to FIG. 8. The following describes an apparatus and a device provided in embodiments of this application with reference to the accompanying drawings.

Figure 9:
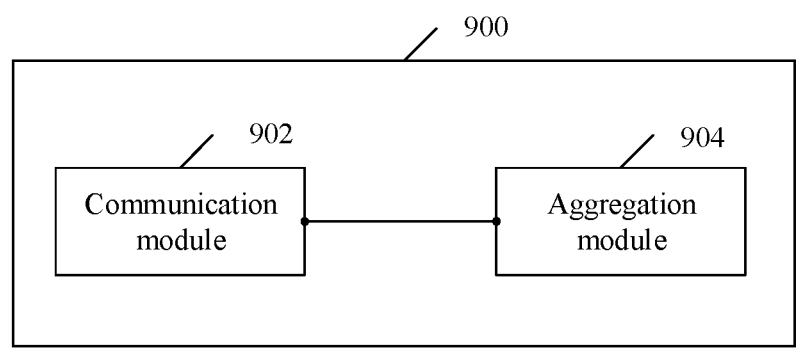
FIG. 9 is a schematic diagram of a structure of a data processing apparatus according to an embodiment of this application.

Refer to a schematic diagram of a structure of a data processing apparatus shown in FIG. 9. The apparatus 900 is applied to a computing cluster, the computing cluster includes a plurality of groups of an all to all structure, each group includes a switching node and a computing node, the apparatus 900 is a switching node that is in a first group and that is configured to communicate with a second top node in a second group, the second top node is a switching node that is in the second group and that is configured to communicate with the apparatus in the first group, and the apparatus 900 includes:

a communication module 902, configured to receive first data sent by a child node, where the child node indicates a node that is in the first group and that is directly connected to the apparatus, where the communication module 902 is further configured to receive second data sent by the second top node; and an aggregation module 904, configured to aggregate the first data and the second data, to obtain third data.

It should be understood that the apparatus 900 in this embodiment of this application may be implemented by using an application-specific integrated circuit (ASIC) or a programmable logic device (PLD). The PLD may be a complex programmable logic device (CPLD), a field-programmable gate array (FPGA), a generic array logic (GAL), or any combination thereof. Alternatively, when the data processing method shown in FIG. 4 is implemented by software, the apparatus 900 and modules of the apparatus 900 may be software modules.

In some possible implementations, the aggregation module 904 is further configured to: aggregate a plurality of pieces of first data sent by the child node; and aggregate the second data and data obtained by aggregating the plurality of pieces of first data, to obtain the third data.

In some possible implementations, the communication module 902 is further configured to send, to the second top node, the data obtained by aggregating the plurality of pieces of first data.

In some possible implementations, the communication module 902 is further configured to send the data to the second top node in any one of the following manners: all to all, ring, and recursive doubling.

In some possible implementations, the child node includes a switching node that is in the first group and that is directly connected to the apparatus 900.

The first data includes partially aggregated data, and the third data is fully aggregated data.

In some possible implementations, the child node includes a computing node that is in the first group and that is directly connected to the apparatus 900.

The first data includes non-aggregated data, and the third data is fully aggregated data.

In some possible implementations, the apparatus 900 further includes:

a control module, configured to join a communication domain before receiving the first data sent by the child node.

In some possible implementations, the control module is specifically configured to:

send a domain joining request to a control node; and receive a domain joining response sent by the control node, where the domain joining response indicates that the apparatus successfully joins the communication domain.

In some possible implementations, the control node is any one of the following:

a node independent of the computing node and the switching node; or one of switching nodes.

In some possible implementations, the control module is specifically configured to:

receive a domain joining request sent by a third top node; and when a domain identifier in the domain joining request is included in a domain identifier list of the apparatus, add an identifier of the apparatus to a node identifier list of the corresponding communication domain.

In some possible implementations, the third top node is a node that is in second top nodes and that is right-connected or left-connected to the apparatus, or a node that is in the second top nodes and that is directly connected to the apparatus.

In some possible implementations, a topology of the computing cluster is a dragonfly network topology.

The data processing apparatus 900 according to this embodiment of this application may correspondingly perform the method described in embodiments of this application, and the foregoing and other operations and/or functions of the modules/units of the data processing apparatus 900 are separately used to implement corresponding procedures of the method in the embodiment shown in FIG. 4. For brevity, details are not described herein again.

An embodiment of this application further provides an electronic device 1000. The electronic device 1000 is a device having a data forwarding function. Specifically, the electronic device 1000 may be a device such as a switch or a router. The electronic device 1000 may be configured to implement a function of the data processing apparatus 900 in the embodiment shown in FIG. 9.

Figure 10:
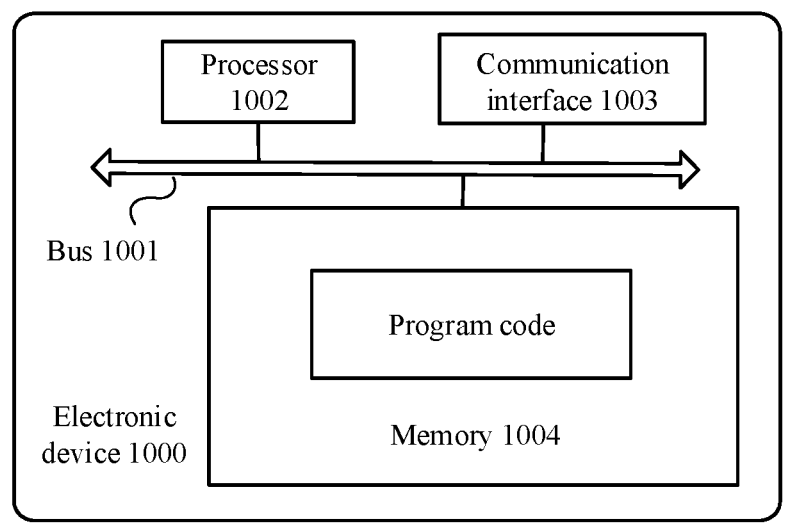
FIG. 10 is a schematic diagram of a structure of an electronic device according to an embodiment of this application.

FIG. 10 is a schematic diagram of a structure of an electronic device 1000. As shown in FIG. 10, the electronic device 1000 includes a bus 1001, a processor 1002, a communication interface 1003, and a memory 1004. The processor 1002, the memory 1004, and the communication interface 1003 communicate with each other through the bus 1001.

The bus 1001 may be a peripheral component interconnect (PCI) bus, an extended industry standard architecture (EISA) bus, or the like. The bus may include an address bus, a data bus, a control bus, and the like. For ease of representation, only one thick line is for representing the bus in FIG. 10, but this does not mean that there is only one bus or only one type of bus.

The processor 1002 may be a central processing unit (CPU). The memory 1004 may include a volatile memory, for example, a random access memory (RAM). The memory 1004 may alternatively include a non-volatile memory, for example, a read-only memory (ROM), a flash memory, a hard disk drive (HDD), or a solid-state drive (SSD).

The communication interface 1003 is configured to communicate with the outside, for example, receive first data sent by a child node, receive second data sent by a second top node, and send, to the second top node, data obtained by aggregating a plurality of pieces of first data.

The memory 1004 stores executable code, and the processor 1002 executes the executable code to perform the foregoing data processing method.

Specifically, when the embodiment shown in FIG. 9 is implemented, and the modules of the data processing apparatus 900 described in the embodiment in FIG. 9 are implemented by software, software or program code required for performing a function of the aggregation module 904 in FIG. 9 is stored in the memory 1004.

A function of the communication module 902 is implemented by using the communication interface 1003. The communication interface 1003 receives the first data sent by the child node, receives the second data sent by the second top node, and transmits the first data and the second data to the processor 1002 through the bus 1001. The processor 1002 executes program code corresponding to each module stored in the memory 1004, for example, executes program code corresponding to the aggregation module 904, to perform the step of aggregating the first data and the second data, to obtain third data.

It should be understood that the electronic device 1000 in this embodiment of this application may correspond to the data processing apparatus 900 in FIG. 9 in the embodiment of this application. The electronic device 1000 is configured to implement operation steps of the method performed by a corresponding body in the method in FIG. 4. For brevity, details are not described herein again.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, DVD), a semiconductor medium (for example, a solid-state drive (SSD)), or the like.

The foregoing descriptions are merely specific implementations of this application. Any variation or replacement readily figured out by a person skilled in the art based on the specific implementations provided in this application shall fall within the protection scope of this application.

What is claimed is:

1. A data processing method, wherein the method comprises:
receiving, by a first top node, a plurality of pieces of first data, wherein each of the plurality of pieces of first data is sent by a different child node of a plurality of child nodes, wherein the first top node is a switching node that is in a first group in which the first top node is located and that is configured to communicate with a second top node in a second group, each child node of the plurality of child nodes is a node that is in the first group and that is directly connected to the first top node, and the second top node is a switching node that is in the second group and that is configured to communicate with the first top node in the first group, wherein the second top node is not a child node of the first top node, wherein the first group and the second group are located in to a computing cluster, and there is at least one direct link between each group and each of other groups in the computing cluster;
receiving, by the first top node, second data sent by the second top node; and
aggregating, by the first top node, the first data and the second data, to obtain third data, wherein the aggregating, by the first top node, the first data and the second data, to obtain third data comprises:
aggregating, by the first top node, the plurality of pieces of first data sent by the plurality of child nodes, to obtain aggregated first data; and
aggregating, bythe first top node, the second data and the aggregated first data, to obtain the third data.

2. The method according to claim 1, wherein the method further comprises:
sending, by the first top node to the second top node, the aggregated first data.

3. The method according to claim 2, wherein the first top node sends the aggregated first data to the second top node in one of the following manners:
all to all, ring, or recursive doubling.

4. The method according to claim 1, wherein at least one child node of the plurality of child nodes comprises a switching node that is in the first group and that is directly connected to the first top node; and
the first data comprises partially aggregated data, and the third data is fully aggregated data.

5. The method according to claim 1, wherein at least one child node of the plurality of child nodes comprises a computing node that is in the first group and that is directly connected to the first top node; and
the first data comprises non-aggregated data, and the third data is fully aggregated data.

6. The method according to claim 1, wherein before the receiving the plurality of pieces of first data, the method further comprises:
joining, by the first top node, a communication domain.

7. The method according to claim 6, wherein the joining, by the first top node, a communication domain comprises:
sending, by the first top node, a domain joining request to a control node; and
receiving, by the first top node, a domain joining response sent by the control node, wherein the domain joining response indicates that the first top node successfully joins the communication domain.

8. The method according to claim 7, wherein the control node is one of the following:
a node independent of a computing node and a switching node; or
one of switching nodes.

9. The method according to claim 6, wherein the joining, by the first top node, a communication domain comprises:
receiving, by the first top node, a domain joining request sent by a third top node; and
when a domain identifier in the domain joining request is comprised in a domain identifier list of the first top node, adding, by the first top node, a node identifier of the first top node to a node identifier list of the corresponding communication domain.

10. The method according to claim 1, wherein a topology of the computing cluster is a dragonfly network topology.

11. A data processing apparatus, comprising:
at least one processor; and
one or more memories coupled to the at least one processor and storing programming instructions for execution by the at least one processor to cause the apparatus to:
receive a plurality of pieces of first data, wherein each of the plurality of pieces of first data is sent by a different child node of a plurality of child nodes wherein the apparatus is a switching node that is in a first group in which the apparatus is located and that is configured to communicate with a second top node in a second group, the second top node is a switching node that is in the second group and that is configured to communicate with the apparatus in the first group, wherein the second top node is not a child node of the apparatus, wherein the first group and the second group are located in a computing cluster, and there is at least one direct link between each group and each of other groups in the computing cluster, and wherein each child node of the plurality of child nodes is a node that is in the first group and that is directly connected to the apparatus,
receive second data sent by the second top node; and
aggregate the first data and the second data, to obtain third data, wherein the aggregate the first data and the second data, to obtain third data comprises:
aggregate the plurality of pieces of first data sent by the plurality of child nodes, to obtain aggregated first data; and
aggregate the second data and the aggregated first data, to obtain the third data.

12. The apparatus according to claim 11, wherein the programming instructions, when executed by the at least one processor, cause the apparatus to:
send, to the second top node, the aggregated first data.

13. The apparatus according to claim 12, wherein the programming instructions, when executed by the at least one processor, cause the apparatusto:
send the aggregated first data to the second top node in one of the following manners: all to all, ring, or recursive doubling.

14. The apparatus according to claim 11, wherein the programming instructions, when executed by the at least one processor, cause the apparatus to join a communication domain before receiving the plurality of pieces of first data.

15. The apparatus according to claim 14, wherein the programming instructions, when executed by the at least one processor, cause the apparatusto:
send a domain joining request to a control node; and
receive a domain joining response sent by the control node, wherein the domain joining response indicates that the apparatus successfully joins the communication domain.

16. The apparatus according to claim 14, wherein the programming instructions, when executed by the at least one processor, cause the apparatus to:
receive a domain joining request sent by a third top node; and
when a domain identifier in the domain joining request is comprised in a domain identifier list of the apparatus, add an identifier of the apparatus to a node identifier list of the corresponding communication domain.

17. A non-transitory computer-readable storage medium, comprising instructions which, when executed by one or more processors, cause a first top node to:
receive a plurality of pieces of first data, wherein each of the plurality of pieces of first data is sent by a different child node of a plurality of child nodes, wherein the first top node is a switching node that is in a first group in which the first top node is located and that is configured to communicate with a second top node in a second group, each child node of the plurality of child nodes is a node that is in the first group and that is directly connected to the first top node, and the second top node is a switching node that is in the second group and that is configured to communicate with the first top node in the first group, wherein the second top node is not a child node of the first top node, wherein the first group and the second group are located in to a computing cluster, and there is at least one direct link between each group and each of other groups in the computing cluster;
receive second data sent by the second top node; and
aggregate the first data and the second data, to obtain third data, wherein the aggregate the first data and the second data, to obtain third data comprises:
aggregate the plurality of pieces of first data sent by the plurality of child nodes, to obtain aggregated first data; and aggregate the second data and the aggregated first data, to obtain the third data.

18. The non-transitory computer-readable storage medium of claim 17, wherein the instructions, when executed by the one or more processors, cause the first top node to:
send, to the second top node, the aggregated first data.

19. The non-transitory computer-readable storage medium of claim 18, wherein the instructions, when executed by the one or more processors, cause the first top node to:
send the aggregated first data to the second top node in one of the following manners: all to all, ring, or recursive doubling.

20. The non-transitory computer-readable storage medium of claim 17, wherein the instructions, when executed by the one or more processors, cause the first top node to join a communication domain before receiving the plurality of pieces of first data.

* * * * *

UNITED STATES PATENT AND TRADEMARK OFFICE
CERTIFICATE OF CORRECTION

| | | |
|---|---|---|
| PATENT NO. | : 12,225,083 B2 | Page 1 of 1 |
| APPLICATION NO. | : 18/117242 | |
| DATED | : February 11, 2025 | |
| INVENTOR(S) | : Qihang Duan | |

It is certified that error appears in the above-identified patent and that said Letters Patent is hereby corrected as shown below:

In the Claims

In Column 20, In Line 62, In Claim 1, delete "bythe" and insert -- by the --.

In Column 22, In Line 16, In Claim 13, delete "apparatusto:" and insert -- apparatus to: --.

In Column 22, In Line 26, In Claim 15, delete "apparatusto:" and insert -- apparatus to: --.

Signed and Sealed this
Fifteenth Day of July, 2025

Coke Morgan Stewart
*Acting Director of the United States Patent and Trademark Office*